J. D. BUCHANAN,
INVENTOR.

BY W. E. Beatty

ATTORNEY.

Feb. 28, 1956 J. D. BUCHANAN 2,736,778
HYDRAULIC PRESSURE OPERATED SWITCH
Filed May 9, 1952 2 Sheets-Sheet 2

J. D. BUCHANAN,
INVENTOR.

BY W E Beatty
ATTORNEY.

//  # United States Patent Office 2,736,778
Patented Feb. 28, 1956

2,736,778

HYDRAULIC PRESSURE OPERATED SWITCH

J. D. Buchanan, Burbank, Calif.

Application May 9, 1952, Serial No. 286,991

5 Claims. (Cl. 200—82)

The invention relates to an hydraulic pressure operated switch, and more particularly to a switch controlling a signal to show when the fluid pressures reaches a certain low value.

The various parts of an aeroplane are operated by hydraulic motors or pistons supplied with hydraulic oil under pressure. Such devices will not operate properly if the pressure reaches a certain low value, and it has been proposed to provide a signal light at the pilot's position in order to show the condition of such fluid pressure. The design of a suitable switching mechanism for this purpose has entailed some difficulties for the reason that the system pressure usually is very high, such as 3,000 lbs. p. s. i., whereas the switch should remain open for all pressures higher than a much lower value, such as 75 lbs. p. s. i., and the switch should close to operate the signal for still lower pressure such as 40 lbs., p. s. i., or less. One must guard against leakage into the switch mechanism, as oil would interfere with the proper operation of the switch. If the usual type of ring seal or other packing material in sufficient amount is applied to a piston so as to effectively seal it against the system pressure of 3,000 lbs. p. s. i., the frictional load or hysteresis becomes so great that the piston is sluggish in its operation and the piston will not open or close at the desired low pressures within reasonably close limits.

Another problem arises in operating a switch, such as a micro-switch, in a positive manner, by the movement of a fluid pressure operated piston or the like, while preventing false operation due to the vibration of the aeroplane or the like in which the switch is mounted.

According to the present invention, the above disadvantages are overcome by providing a piston with a seal which is effective at the low operating pressure of 75 or 40 lbs. p. s. i., and by supplementing the action of such seal with a valve head and seat on the piston and its cylinder, to seal off pressures in excess of the operating pressure of 75 lbs. p. s. i., to prevent leakage through the cylinder into the switch mechanism. It thus becomes unnecessary to provide in the piston itself a seal which is effective at the system pressure, and the piston seal may take the form of a plurality of spaced grooves which have no packing material therein. As the piston itself has small hysteresis it moves out at one pressure, by spring action, and moves in at a higher pressure, both within very close limits.

Positive action of the switch is obtained by providing a hammer-like switch operating member controlled by a spring, and having a sear connection with the plunger. When the plunger moves in, it does so not only against the action of its own spring but also against the action of the switch operating spring, whereupon a cam device releases the sear so that the switch operating member moves with a snap action to operate the switch. When the switch is thus operated, the switch operating spring does not act to move the plunger. In other words, when the plunger is moving in, as the pressure approaches 75 lbs. p. s. i., it is opposed by its own spring and by the switch operating spring, whereas when the plunger reaches the limit of its inward movement, it is acted on only by its own spring. While this is an incident to the snap acting switch operating mechanism disclosed, this feature has the advantage of sharply defining a wide difference in pressure, for example, 40 and 75 lbs. p. s. i., as above stated, at which the plunger will operate within close limits. For example, while the requirement is that the plunger move out to operate the switch controlling the signal lamp at 40 lbs. p. s. i., plus or minus 10 lbs. p. s. i., a switch device constructed as shown herein has been found to reduce that margin to 1 lb. p. s. i., instead of 10 lbs. p. s. i., at temperatures in the neighborhood of 72° F. and with a margin of less than 10 lbs. p. s. i., throughout a temperature range of minus 65° to 250° F. Also the requirement is that the plunger move in to operate the switch at a pressure of 75 lbs. p. s. i., plus or minus 20 lbs. p. s. i., whereas the switch plunger of this invention, as shown by tests, moves in at 75 lbs. p. s. i., plus or minus 5 lbs. p. s. i., at temperatures in the neighborhood of 72° F. and the margin is less than 20 lbs. p. s. i. throughout the above-mentioned wide temperature range.

For further details of the invention reference may be made to the drawing wherein.

Figure 5:
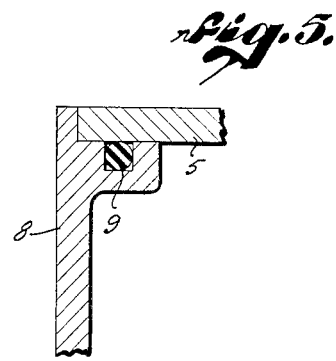
Fig. 5 is a sectional view on line 5—5 of Fig. 1 looking in the direction of the arrows.

Referring in detail to the drawings, the switch 1 comprises a casing 2 having upright walls 3 and 4, a top wall 5 and a side wall 6 which define a switch chamber 7 containing a micro-switch 80. The switch chamber 7 has a cover plate 8 provided with a suitable seal as indicated at 9 in Fig. 5 and the cover plate 8 is held in place by bolts like 10 and 11 in Fig. 1, the latter closing an access opening 12 so that the interior of the casing 2 can be filled with an inert gas such as nitrogen.

The casing 2 at one side of the switch chamber 7 has a through bore 13, one end of which has threads 14 for a sleeve 15 which has a flange 16 provided with a seal 17. The inner end 18 of sleeve 15 abuts against the outer end 19 of a cylinder 20, to hold the enlarged head 21 of the cylinder against a shoulder 22 in the bore 13. The head 21 has a suitable seal indicated at 23. All seals shown are for the purpose of preventing leakage of the inert gas in the casing 2. The inner portion 24 of cylinder 20 is of smaller outside diameter than the bore 13 and its inner end 25 terminates adjacent an opening 26 between the chamber 7 and the bore 13, to provide an operative connection, later described, between the plunger 30 and the switch 80.

The plunger 30 comprises a piston which slidably fits in the bore 31 in the cylinder 20, being provided with a plurality of spaced sealing grooves like 32, which have no packing material therein as described above. The plunger 30 at its outer end has a conical valve head 33 adapted to seat on the seat 34 formed by the intersection of the cylindrical bore 31 with a plane at right angles to the axis of that bore. The seat 34 and valve head 33 thus serve as a seal to prevent excess pressure in inlet 100 as above described, from leaking past the grooves 32 into the switch chamber 7. The seat 34 thus serves as a stop to limit the inward movement of the plunger 30, while its outward movement is limited by the valve head 33 abutting the end 18 of sleeve 15.

The other end of bore 13 has threads 35 for hollow nut 36 having a barrel 38 for the mainspring 37 for plunger 30. The outer end of spring 37 is arranged in the barrel 38 while its other end is on a post 39 on a disc trigger like member 40 having a post 41 which fits in the bore 42 in the plunger 30.

The nut 36 has a kerf 43 to adjust the tension of the spring 37, the nut 36 having a lock 44 of resilient material such as nylon. A similar adjustable nut 45 is provided for a spring 46 for operating the hammer or switch operating member 50. The thread bore 47 for nut 45 and the bore for nut 36 are closed by a cover 51 held in position by bolts like 52 and having a seal indicated at 53.

The spring 46 has a cup 55 which slides in the bore 56 in the nut 45. Cup 55 has an outer end 57 which bears on the convex projection 58 at the outer end of the hammer 50. The hammer 50 as shown also in Fig. 2, is in the form of a plate or link and it is slidably supported for movement edgeways by the upright wall 60 at the bottom of chamber 7 on the one hand, and the heads 61, 62 of two bolts each of which has threaded engagement with the wall 60 as shown in 63 in Fig. 2, each such bolt having a smooth cylindrical surface like 64 for the slots 65 and 66 in the hammer 50.

The micro-switch 80 is well-known and comprises a casing 81 supported on the wall 6 by bolts 82, 83. The switch 80 has a contact spring 84 connected to a terminal 85 connected by a line indicated at 86 to a cannon socket 87 mounted on the wall 4. The socket 87 has a well-known plug, not shown, for connection to a signal circuit 88 having a lamp 89. Whether the lamp is on all the time while the pressure is 75 lbs. p. s. i., or more, and extinguished when the pressure drops to 40 lbs. p. s. i., or whether the lamp is lighted when the pressure drops to 40 lbs. p. s. i., is a matter of choice, the latter being shown. With the parts in the position shown in Fig. 1 the hammer 50 tilts the switch arm 90 about its pivot 91 to operate spring 84 to the position shown, the back contact 92 being disconnected from the circuit and simply serving as a stop. When the pressure drops and spring 37 pushes plunger 30 outwardly, the hammer 50, as later described, assumes the position shown in Fig. 3 wherein the leaf-spring 93 urges the contact 94 against contact 95 to close the circuit 88 and light the lamp 89. Contact 95 is connected to terminal 96 and the latter is connected by a line, indicated at 97, to the socket 87.

Figure 1:
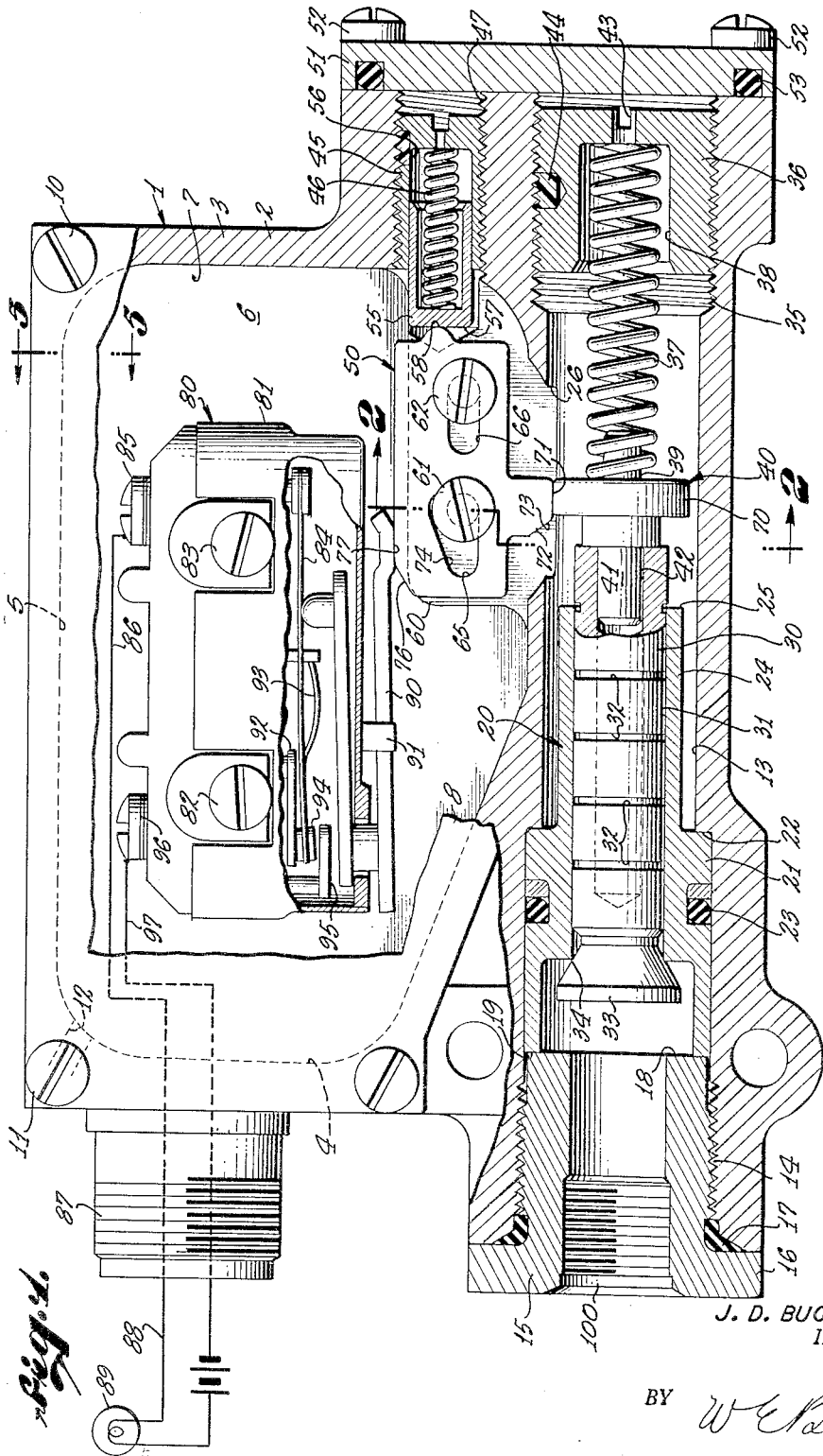
Fig. 1 is a side view in elevation partly in section, and with parts broken away, of an hydraulic pressure operated switch according to the present invention.
Figure 2:
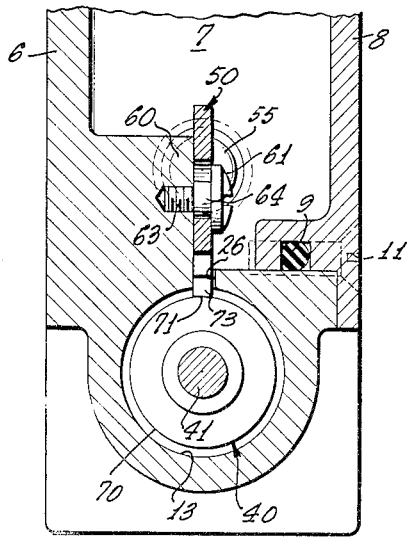
Fig. 2 is a sectional view on line 2—2 of Fig. 1 looking in the direction of the arrows.
Figure 3:
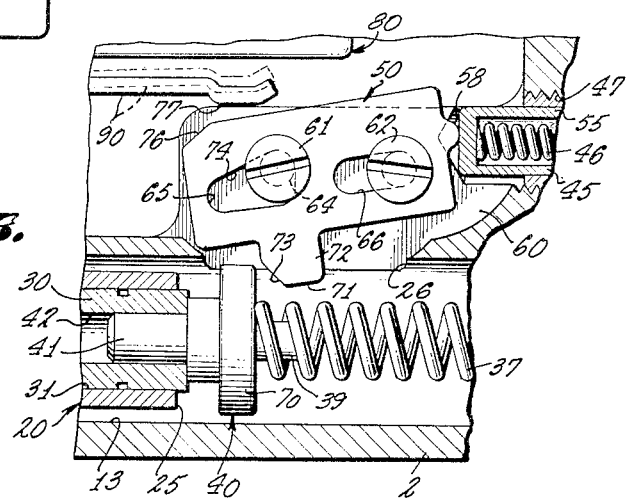
Figs. 3 and 4 are partial plan views, corresponding to Fig. 1, with parts broken away, showing the switch operating mechanism in different positions.

When the hammer 50 is in the position shown in Fig. 1, it is blocked against vibration as it cannot move sideways due to the wall 60 and the bolt heads 61, 62, as shown in Fig. 2. It cannot move up and down as shown in Fig. 1 because it is blocked between the disc abutment or trigger 40 and the bolt surface 64 in slot 65, and in a transverse direction as seen in Fig. 1, the right-hand ends of slots 65, 66 are held in engagement with the bolt surfaces like 64, by the spring 46. As shown in Fig. 3, hammer 50 is limited in its downward position by cam slot 65, and held against vibration by spring 46.

Figure 4:
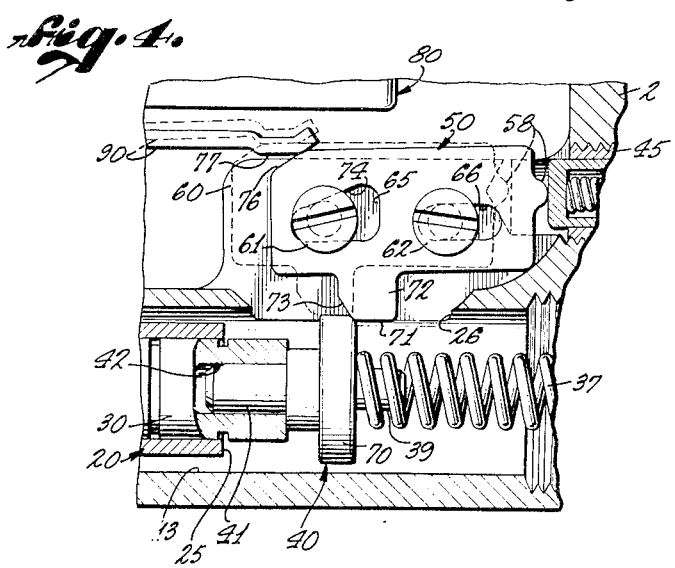

The trigger 40 is in the form of a shoulder having a cylindrical surface 70 upon which rests the lower end 71 of a trigger extension 72 on the hammer 50, when the parts are in the position shown in Fig. 1. The lower end 71 of trigger 72 and more particularly the surface or periphery 70 extends parallel to the line of travel of the plunger 30. At this time, the spring 46 does not exert any force tending to move the plunger 30 outwardly. The spring force tending to move the plunger 30 outwardly is that due solely to the mainspring 37, and its force can be adjusted by the nut 36. As above described, by way of example, it is assumed that when the pressure in inlet 100 drops to a value such as 40 lbs. p. s. i., the spring 37 then overcomes the fluid pressure acting on the piston 31. The plunger surface or shoulder surface 70 is of limited length, that is, it terminates abruptly in a discontinuity at its rise or inner end so that the trigger extension 72 can drop below the level of the surface 70 when the pressure is low as shown in Fig. 3. The trigger extension 72 has a sear or inclined surface 73 which terminates abruptly at its lower end and continues as surface 71 so that the trigger extension 72 can escape from the front of shoulder 40 as shown in Fig. 3 to a position with surface 71 slideably fitting and resting on the shoulder periphery 70 as shown in Fig. 1. The switch operating member 50 has an effective width greater than the distance between the shoulder surface 70 and the switch element 90, so that the switch element 90 is operated when the switch operating member 50 is in the position shown in Fig. 1 wherein one of its edges rests on the surface 70 and its opposite edge is acting on the switch element 90. When the plunger 30 moves in, as trigger extension 72 initially comes to rest on the plunger surface 70 to operate the switch, the plunger 30 can overtravel beyond this point as the surfaces 70 and 71 are parallel to the line of travel of the plunger, the surface 70 extending outwardly that is to the left as seen in Fig. 4, from its inner sear end.

When the inlet pressure drops to a certain low value and plunger 30 moves outwardly, as limited by the stop 13, the surface 70 moves outwardly beyond the end 71 of the trigger 72, whereupon the spring 46, which acts on projection 58 off center from and above the axis of bolt head 62, urges the hammer 50 about that axis to the position shown in Fig. 3, wherein the trigger 72, and in particular its sear surface 73 is in line with and behind the shoulder 40 which acts as a cooperating sear. When the hammer 50 is tilted down as shown in Fig. 3, the switch arm 90 moves to its alternate position shown in full lines. When the pressure increases above 40 lbs. p. s. i., the plunger 30 moves in until the shoulder 40 contacts the trigger 72 at the sear 70, 73 and thereafter the further inward movement of plunger 30 is opposed by both spring 37 and spring 46. Both the slots 65 and 66 are elongated and as the plunger 30 continues to move inwardly it stores up energy in or cocks the spring 45, and in moving in, the cam surface 74 at the top of slot 65 rides on the bolt surface 64 to gradually lift the hammer 50 to a position where the trigger 72 escapes the shoulder 40, whereupon the hammer 50 shoots forward with a snap action under control of spring 46, and in so doing the inclined surface 76 at the top front of hammer 50 slides under the convex end 77 of switch arm 90 to move it to the position shown in Fig. 1 and in broken lines in Fig. 3.

Various modifications may be made in the invention without departing from the spirit of the following claims.

I claim:

1. An hydraulic pressure operated switch comprising a reciprocating plunger having a fluid pressure operated piston for operating said plunger to one position, a spring urging said plunger to another position, an operating member, a spring for said operating member, cooperating means on said member and on said plunger for operating said member to cock the same against the action of said spring of said operating member and means operated by said cocking movement for releasing said operating member for operation by its cocked spring with a snap action, a switch controlled by said operating member, and an operating connection between said operating member and said switch for maintaining said switch operated while said piston is operated to said one position by fluid pressure.

2. An hydraulic pressure operated switch comprising a micro-switch having an actuating member, an operating member therefor, means supporting said operating member for movement to actuate said actuating member and maintain said actuating member and said micro-switch operated at certain times, a spring urging said operating member forward to a position where it may or may not engage said actuating member, a reciprocating plunger, an abutment on said plunger and cooperating means on said operating member for supporting said operating member to maintain engagement with said actuating member in one position of said plunger and for releasing said operating member from said actuating member in another position of said plunger, means on said operating member cooperating with said abutment to cock said spring, and means operated by said cocking movement to release said operating member for action by its spring to engage said actuating member.

3. An hydraulic pressure operated switch comprising a reciprocating plunger, an abutment on said plunger, a link, a loose pivotal support for said link, a spring for said link and arranged at one side of said support for urging said link towards said abutment, a cam slot in said link, a cam therefor, a switch having an actuating member in the path of said link, said link having a trigger actuated by said abutment for compressing said spring and operating said cam and cam slot to operate said link to a position where said trigger escapes said abutment for sudden action of said link by its said compressed spring to operate said actuating member, said abutment having a surface supporting said trigger in its actuated position when said plunger is in one position, said abutment in another position of said plunger being free from supporting engagement with said link to permit said link spring to move said link into position for cocking by said plunger.

4. The combination of a reciprocating member having an abutment, a link, a loose pivotal support for said link, a spring for said link and arranged at one side of said support for urging said link towards said abutment, a cam slot in said link, a cam therefor, a driven member in the path of said link, said link having a trigger actuated by said abutment for compressing said spring and operating said cam and cam slot to operate said link to a position where said trigger escapes said abutment for sudden action of said link by its said compressed spring to operate said driven member, said abutment having a surface supporting said trigger in its actuated position when said reciprocating member is in one position, said abutment in another position of said reciprocating member being free from supporting engagement with said link to permit said link spring to move said link into position for cocking by said reciprocating member.

5. A switch comprising a plunger having a piston having a plurality of spaced sealing grooves having no packing therein, said plunger having a valve head at one end thereof, a seat for said valve head, a mainspring at the other end of said plunger urging said valve head open, an auxiliary spring at one side of said mainspring, a follower for said auxiliary spring, means supporting said follower for action of its said spring to move said follower to engage said plunger when said valve head is open and resist closing movement of said valve head and increase the force of said auxiliary spring, a switch, and means responsive to said closing movement for releasing said follower from said plunger for snap action of said follower under control of its spring to a position mantaining engagement with said switch and said plunger.

References Cited in the file of this patent

UNITED STATES PATENTS

| | | |
|---|---|---|
| 730,121 | Hill | June 2, 1903 |
| 1,018,594 | Turner | Feb. 27, 1912 |
| 1,073,175 | Schadel | Sept. 16, 1913 |
| 1,183,790 | Allen | May 16, 1916 |
| 1,302,567 | La Bour et al. | May 6, 1919 |
| 1,468,548 | Winter | Sept. 18, 1923 |
| 2,119,005 | Carter | May 31, 1938 |
| 2,331,997 | Mensenkamp | Oct. 19, 1943 |
| 2,492,261 | Bordelon | Dec. 27, 1949 |
| 2,511,271 | Kaminky et al. | June 13, 1950 |